G. A. COMPTON, A. B. NESS, W. H. GAUSEWITZ AND G. A. GREEN.
COLLAPSIBLE ARCH FORM.
APPLICATION FILED OCT. 11, 1918.
1,306,172.
Patented June 10, 1919.
3 SHEETS—SHEET 3.
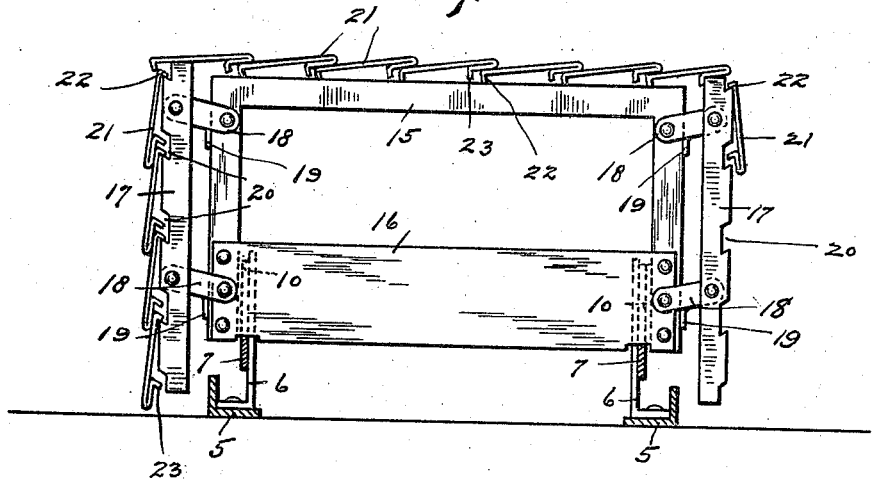
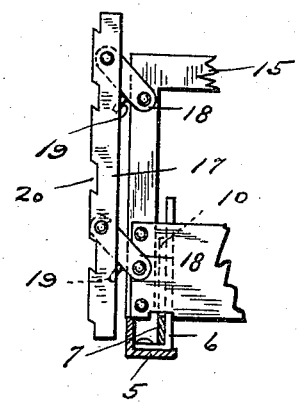

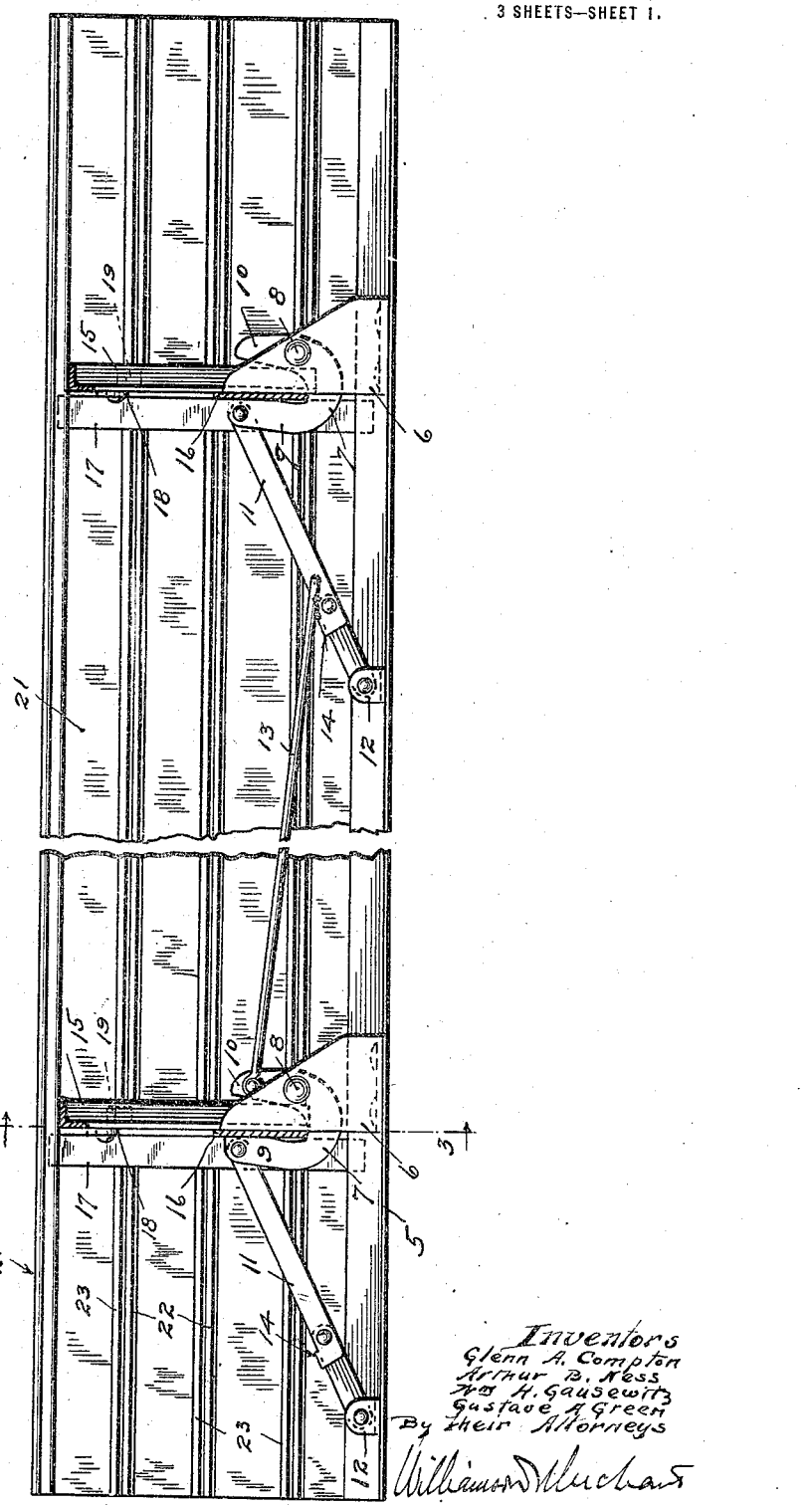

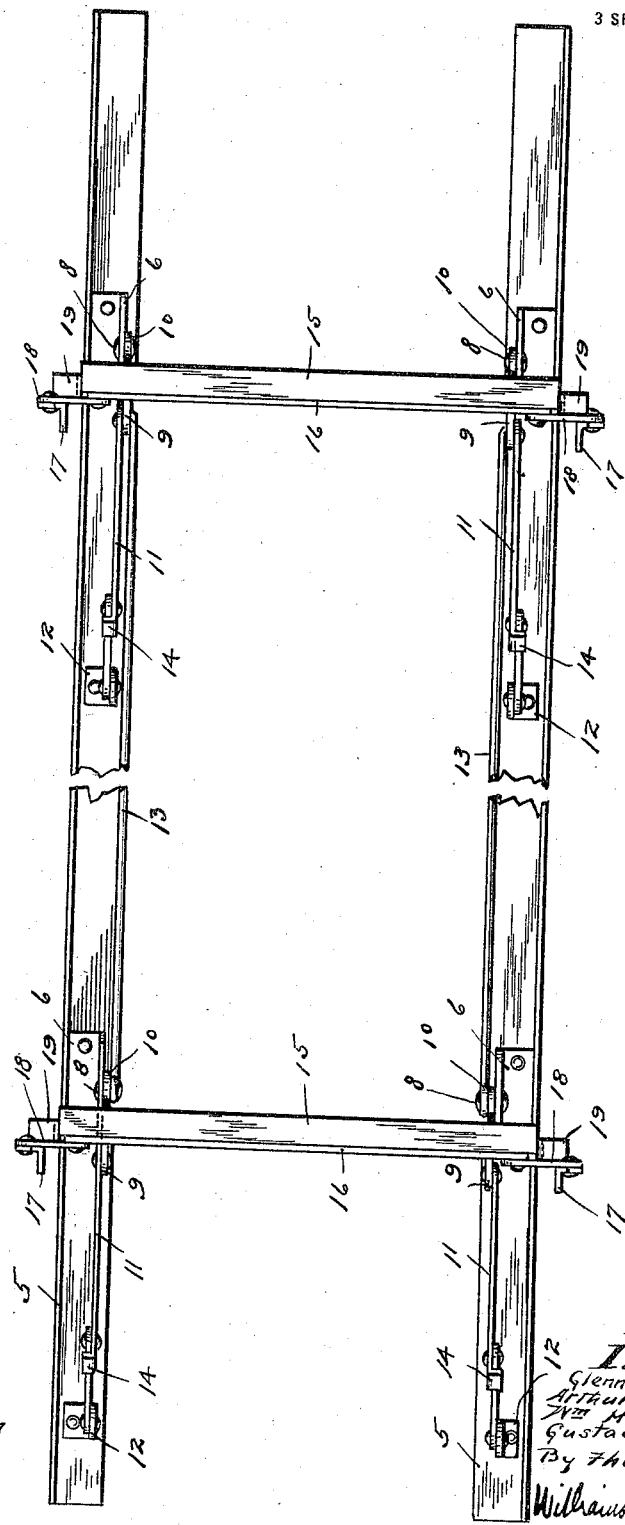

UNITED STATES PATENT OFFICE.

GLENN A. COMPTON AND ARTHUR B. NESS, OF MINNEAPOLIS, AND WILLIAM H. GAUSEWITZ AND GUSTAVE A. GREEN, OF ST. PAUL, MINNESOTA, ASSIGNORS TO EVERLAST MANUFACTURING COMPANY, INCORPORATED, OF MINNEAPOLIS, MINNESOTA, A CORPORATION OF MINNESOTA.

COLLAPSIBLE ARCH-FORM.

1,306,172.          Specification of Letters Patent.     Patented June 10, 1919.

Application filed October 11, 1918. Serial No. 257,686.

*To all whom it may concern:*

Be it known that we, GLENN A. COMPTON, ARTHUR B. NESS residing at Minneapolis, in and GUSTAVE A. GREEN, citizens of the United States, GLENN A. COMPTON and ARTHUR B. NESS, residing at Minneapolis, in the county of Hennepin, State of Minnesota, and WILLIAM H. GAUSEWITZ and GUSTAVE A. GREEN residing at St. Paul, in the county of Ramsey, State of Minnesota, have invented certain new and useful Improvements in Collapsible Arch-Forms; and we do hereby declare the following to be a full, clear, and exact description of the invention, such as will enable others skilled in the art to which it appertains to make and use the same.

Our invention relates to improvements in collapsible arch forms especially adapted for use in the construction of concrete bridges, culverts, conduits, and the like, and more particularly to such structures having substantially rectangular openings therethrough.

To the above end, generally stated, the invention consists of the novel devices and combinations of devices hereinafter described and defined in the claims.

In the accompanying drawings, which illustrate the invention, like characters indicate like parts throughout the several views.

Referring to the drawings,

Figure 1 is a fragmentary view in longitudinal central section;

Fig. 2 is a fragmentary plan view with the side and top plates removed;

Fig. 3 is a view, partly in end elevation and partly in transverse vertical section, taken substantially on the line 3—3 of Fig. 1; and Fig. 4 is a fragmentary detail view of certain of the parts shown in Fig. 3, with the exception that the form is collapsed.

The numeral 5 indicates a pair of laterally spaced longitudinal sills, as shown, in the form of angle bars, the vertical flanges of which are turned outward and upward. Riveted or otherwise rigidly secured to the horizontal flanges of the sills 5, inward of their ends, are four bearing brackets 6 arranged in laterally spaced pairs. A U-shaped tripping abutment 7 is connected by a rivet 8 to the outer face of each bearing bracket 6. One of the prongs of each tripping abutment 7 affords a retaining member 9 and the other of said prongs affords a releasing member 10. It is important to note that the pivots 8 are located in the releasing members 10, just above the intermediate portions of the tripping abutments 7.

The free or upper ends of the retaining members 9 are connected by toggles 11 to the sills 5. The toggles 11 comprise long and short arms, the former of which are pivoted to the retaining members 9 and the latter of which are pivoted to brackets 12 rigidly secured to the horizontal flanges of the sills 5. Long oblique tripping rods 13 connect the free or upper ends of the releasing member of the left-hand (with respect to Fig. 1) tripping abutments 7 to the alined long arms of the toggles 11 of the right-hand tripping abutments, just above the joints thereof. The toggles 11 are arranged to buckle in an upward direction, and stops 14 on the long arms of said toggles engage the short arms thereof to limit their straightening movement.

Supported from each laterally spaced pair of tripping abutments 7 and brackets 6, is a rectangular arch 15 in the form of an angle bar. These arches 15 extend transversely over the sills 5 and their lower ends are rigidly connected by flat tie bars 16. The lower edges of the tie bars 16 rest on the transverse portion of the tripping abutments 9 and support the arches 15 therefrom in elevated positions. The arches 15 are held in upright positions, having their tie bars 16 pressed against the brackets 6 by the retaining members 9 and securely held by the toggles 11.

Side plate supporting bars 17 are connected by short links 18 to the arches 15, for vertical parallel movement with respect to the side members thereof. These links 18 are provided with depending stops 19, which engage the side members of the arches 15 to limit the downward movement of the bars 17 and hold said links in oblique position, as shown in Fig. 3. In the outer edges of the bars 17, are vertically spaced notches 20 for detachably and removably supporting a plurality of slats 21 which constitute side plates. A plurality of these slats 21 are detachably and removably supported on the horizontal members of the arches 15 and upper ends of the bars 17 and constitute a top plate. Each slat 21 has one of its longitudinal edge portions to form a hook-shaped flange 22 and the other edge portion thereof is folded upon itself and then bent to form a flange 23, which extends in the same direction as the flange 22 and substantially parallel thereto.

The slats 21, forming the side plate, are detachably and removably suspended from the bars 17 by having their flanges 22 interlocked with the shoulders of the notches 20, which are made oblique to more securely hold the slats in position. The lower or folded edges of the slats 21 extend over the upper edges of adjoining slats to afford lap joints therebetween. The flanges 23 of the side plates extend into the notches 20 above the flanges 22. To form the top plate, the slats 21 are arranged in the same manner as in the side plates, so as to form lap joints.

In setting up the collapsible form, the sills 5 are first positioned and then the arches 15 are mounted on the tripping abutments 9 and the toggles straightened, as shown in Fig. 1. The slats 21 of the side plates are next hung on the bars 17 and the remaining slats 21 placed on top of the arches and upper ends of the bars 17 to form the top plate. It will thus be seen that the form may be very quickly set up in position to support the concrete or other materials from which the arch is to be formed.

After the arch is completed and the materials from which it is constructed properly set, the form may be removed by first buckling the two left-hand (with respect to Fig. 1) toggles 11. This buckling of the left-hand toggles will simultaneously buckle the right-hand toggles through the rods 13. The buckling of the toggles will cause the tripping abutments 7 to swing on their pivots 8 from beneath the tie bars 16 and carry the retaining members 9 thereof out of engagement with said tie bars. The final movement of the tripping abutments will cause their releasing members 10 to engage the tie bars 16 and move the same laterally to assist in collapsing the form. With the tripping abutments out of the way, the arches 15 will drop, and the downward pull on the links 18 will cause the bars 17 to pull away from the side plates and move into positions, as shown in Fig. 4. In case any of the slats, either of the top or side plates, adhere to the formed arch, they may be readily removed. With the form collapsed, the same may be very quickly and easily removed from under the formed arch.

What we claim is:—

1. A collapsible form for use in the construction of arches including a tripping abutment, and an arch bar supported on the tripping abutment and having a supplemental side extension connected thereto for movement transversely of the arch.

2. A collapsible form for use in the construction of arches including a tripping abutment, an arch bar supported on the tripping abutment and having a supplemental side extension connected thereto for movement transversely of the arch, and a side plate supported from said side extension.

3. A collapsible form for use in the construction of arches including a tripping abutment, an arch bar supported on the tripping abutment and having a supplemental side extension connected thereto for movement transversely of the arch, said side extension having vertically spaced shoulders, and a side plate comprising slats reversely supported from said shoulders.

4. A collapsible form for use in the construction of arches including a tripping abutment, an arch bar supported on the tripping abutment and having a supplemental side extension connected thereto for movement transversely of the arch, said side extension having vertically spaced shoulders, and a side plate comprising slats having flanges arranged to rest upon said shoulders to support the slats therefrom.

5. A collapsible form for use in the construction of arches including a tripping abutment, and an arch bar supported on the tripping abutment and having supplemental side extensions connected thereto for movement transversely of the arch.

6. A collapsible form for use in the construction of arches including a tripping abutment, an arch bar supported on the tripping abutment and having supplemental side extensions connected thereto for movement transversely of the arch, and side plates supported from said side extensions.

7. A collapsible form for use in the construction of arches including a tripping abutment, an arch bar supported on the tripping abutment and having supplemental side extensions connected thereto for movement transversely of the arch, side plates supported from said side extensions, and a top plate supported in part from said side extensions.

8. A collapsible form for use in the construction of arches including a tripping abutment, and an arch bar supported on the tripping abutment and having supplemental side extensions connected thereto for compound vertical and horizontal movements.

9. A collapsible form for use in the construction of arches including a tripping abutment, an arch bar supported on the tripping abutment and having supplemental side extensions connected thereto for compound vertical and horizontal movements, and stops limiting the downward vertical movement of said side extensions.

10. A collapsible form for use in the construction of arches including a tripping abutment, an arch bar supported on the tripping abutment, a pair of side plate supporting bars, and links connecting said bars to the arch bars for compound vertical and horizontal movements.

11. A collapsible form for use in the construction of arches including a tripping abutment, an arch bar supported on the tripping abutment, a pair of side plate supporting bars, links connecting said bars to the arch bars for compound vertical and horizontal movements, and stops on the links arranged to engage the arch bars to limit their downward vertical movement in respect thereto.

12. A collapsible form for use in the construction of arches including a pair of tripping abutments, a pair of longitudinally spaced arch bars supported on the tripping abutments, and a connection, including a toggle, between the tripping abutments for simultaneously moving and holding the same in operative positions.

13. A collapsible form for use in the construction of arches including a pair of longitudinally spaced brackets, tripping abutments pivoted to the brackets, a pair of arch bars supported on the tripping abutments, toggles for moving the tripping abutments and holding the same in operative positions, and a rod connecting the toggle of one of the tripping abutments to the other of said tripping abutments.

14. A collapsible form for use in the construction of arches including a pair of longitudinally spaced brackets, tripping abutments pivoted to the brackets, arch bars supported on the tripping abutments, said tripping abutments having retaining members for holding the arch bars in upright positions against the brackets and also having releasing members engageable with the arch bars in collapsing the form, toggles attached to said retaining members for holding the tripping abutments in operative positions, and a rod connecting one of the tripping abutments to the releasing member of the others of said tripping abutments.

15. A collapsible form for use in the construction of arches including a pair of laterally spaced sills, a pair of longitudinally spaced brackets secured to each of the sills, a tripping abutment pivoted to each of the brackets and having an arch bar retaining member and an arch bar releasing member, a pair of arch bars supported on laterally spaced pairs of tripping abutments and held in upright positions against the brackets by the retaining members thereof, toggles connecting the retaining members of the tripping abutments to the sills, and rods connecting the retaining members of one of the laterally spaced pairs of tripping abutments to the toggles of the other laterally spaced pair of tripping abutments.

In testimony whereof we affix our signatures in presence of two witnesses.

GLENN A. COMPTON.
ARTHUR B. NESS.
WILLIAM H. GAUSEWITZ.
GUSTAVE A. GREEN.

Witnesses:
CLARA DEMAREST,
HARRY D. KILGORE.

Copies of this patent may be obtained for five cents each, by addressing the "Commissioner of Patents, Washington, D. C."